Sept. 6, 1949.  R. C. GOFF  2,481,308
TRACTION CHAIN DEVICE
Filed April 8, 1947  2 Sheets-Sheet 1
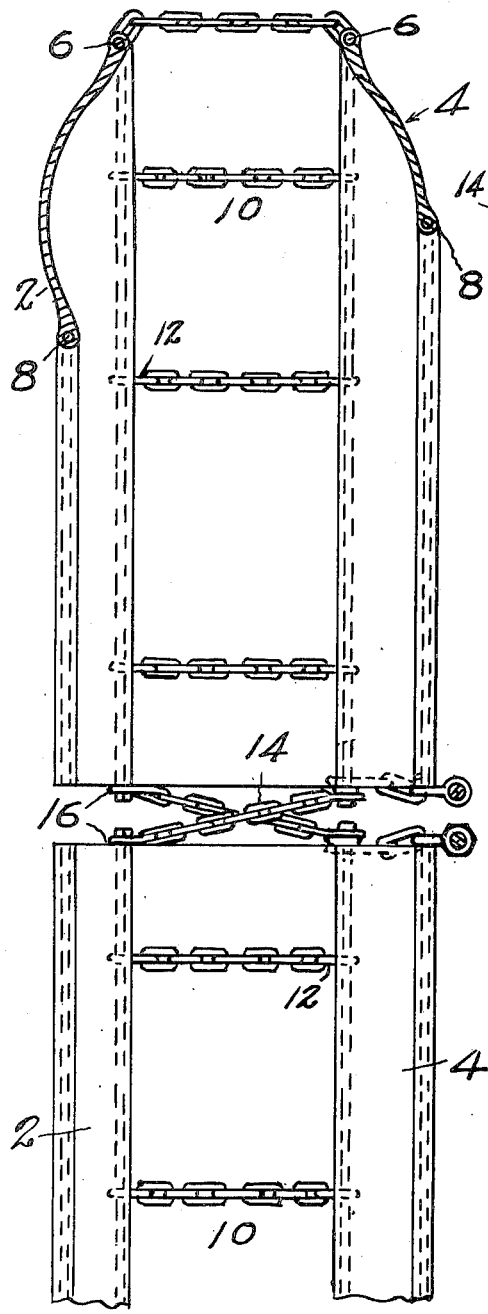
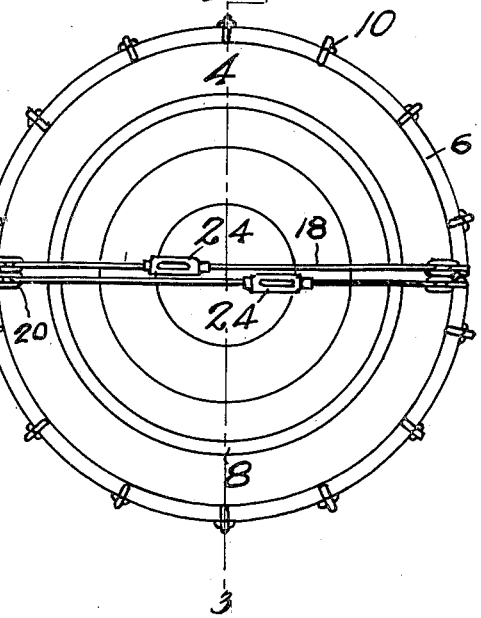
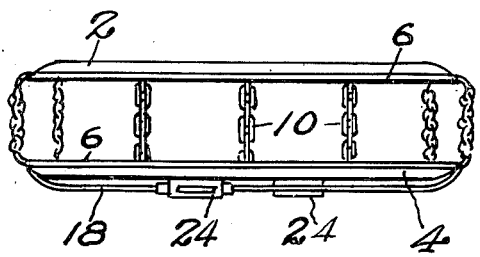
INVENTOR.
RICHARD C. GOFF
BY
Charles K. Davies & Son
Attys.

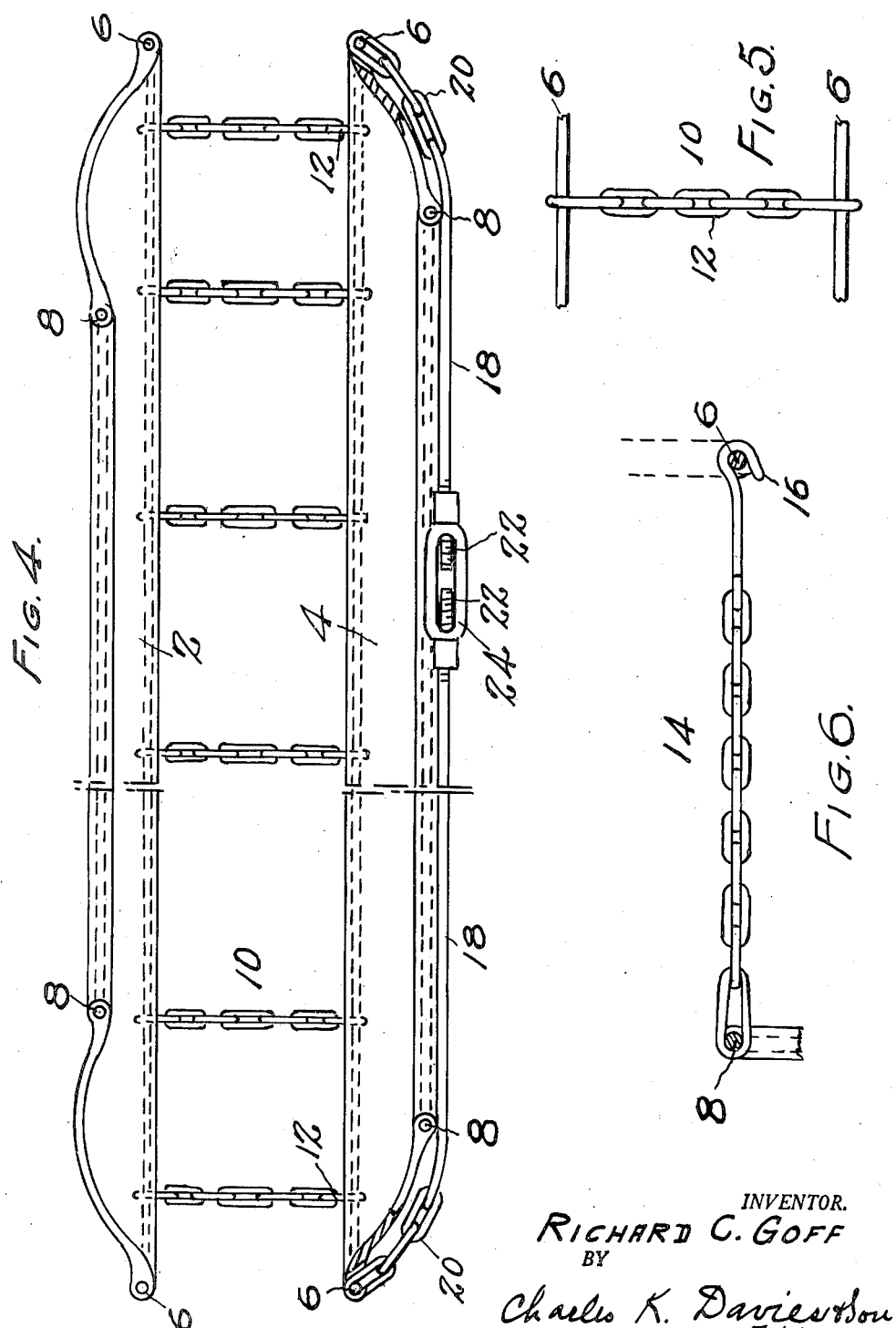

Patented Sept. 6, 1949

2,481,308

UNITED STATES PATENT OFFICE 2,481,308

TRACTION CHAIN DEVICE

Richard C. Goff, Rockville, Md.

Application April 8, 1947, Serial No. 739,991

2 Claims. (Cl. 152—231)

My present invention relates to an improved traction chain device for automotive vehicles and particularly for automobiles. The difficulty in mounting and detaching conventional chains is notorious and it is well known that during the time of greatest need for traction assistance on auto wheels, the difficulty of mounting is the greatest.

To mount the present type of chain requires either jacking up of the rear wheels or laying the chain upon the ground and running the tire thereover either method of which requires the operator to recline upon the ground in mud or snow to fasten the inside hook device for the inner circle chain.

With modern road clearing equipment, through roads are normally cleaned relieving the need for chains while private driveways, lanes, and secondary roads need traction devices for negotiation, thus adding to the necessity for easily removable and attachable devices so that the chains may be easily mounted for use over a short distance and then easily detached.

Therefore the principal purpose of the device of my invention is to afford an unique and novel traction device capable of easy installation and removal.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a side elevational view of a wheel and tire upon which are mounted the traction device sections of my invention.

Fig. 2 is a top plan view thereof.

Fig. 3 is a transverse vertical sectional view through the illustration of Fig. 1.

Fig. 4 is a top plan view of the lower sections.

Fig. 5 is a detail view of a cross link and securing means therefor.

Fig. 6 is a detail view of the end chain employed to engage the rear and front cuffs in taut relation.

Referring now to the drawings wherein I have illustrated the present preferred embodiment of my invention, I employ two identical sections of chain devices each substantially semi-circular and designed to enclose a tire of a vehicle.

Each section consists in a rear deep cuff 2 and a shallow front cuff 4 of strong preferably elastic material to effect a snug fit. Each cuff 2 and 4 is formed with enclosed beads 6 and 8 respectively of wire having flexible or resilient characteristics and at proper spaced intervals around the periphery of the upper or outer beads 6 I connect cross chains 10 formed of conventional steel links 12.

At the ends of the outer beads 6 I secure the attaching chains 14 having hooks 16 at their free ends which after the sections are mounted are secured to the ends of the outer beads of the opposite section. Thus the attaching chains are crossed as shown and securely connect the sections.

As an added securing means for the sections and to maintain the sections independently on the tire I employ rods 18 secured by chains 20 to the ends of the outer beads 6 of each section, and the inner threaded ends 22 of the rods and adjustably secured by turnbuckles 24. As indicated the rods should be of different lengths so that the turnbuckles will not interfere with each other.

In use when the need for traction assistance arises, one section is mounted upon the upper half of the tire and secured snugly by attaching the cross chains temporarily to the opposite bead of the front cuff and the turnbuckle is adjusted to secure the section. The wheel is then revolved one-half revolution, as by driving the automobile and the other section is then mounted upon the now uncovered upper half of the wheel. The turnbuckle is secured taut and the previously attached cross chain 14 is unhooked and secured to the bead of the last mounted section and the chain 14 of the latter is secured to the lower section. Some manipulation of the rods and attaching chains may be required then to secure the sections snugly and securely on the wheel and tire and it will be apparent that the pull will extend across the tire treads and between the lower rods of the outer beads, and by making the inner cuff of each section deeper it will be obvious that the cuff will follow the contour of the tire wall and effect a snug fit.

Thus the chains will have been attached quickly and easily without jacking up the car and the operator need only make the few connections set forth working only on the outer side of the wheel.

To remove the section it is only necessary to detach the chains 14, release the turnbuckle and remove the sections. Various modifications in the exemplified structure will be apparent and the showing herein is to be taken as exemplary rather than limiting.

Having thus fully described my invention what

I claim as new and desire to secure by Letters Patent is:

1. A tire traction device for vehicle wheels comprising a pair of separate sections each having a front and rear cuff of elastic material, stiffening beads in the cuffs, cross chains between the cuffs and secured to the outer beads, diametrically arranged means engaging the outer beads of each section and securing the ends of each section, and transversely arranged attaching chains on the ends of the outer beads of the inner cuff for securing the adjoining ends of the sections to each other.

2. A tire traction device for vehicle wheels comprising a pair of separate sections each having a front and rear cuff of elastic material, stiffening beads in the cuffs, cross chains between the cuffs and secured to the outer beads, transversely arranged means engaging the outer beads of each section and securing the adjoining ends of each section, and transversely arranged attaching chains on the ends of the outer beads of the inner cuff and hooks on said chains engageable with the opposite bead of the other section for securing the ends of the sections to each other.

RICHARD C. GOFF.

REFERENCES CITED

The following references are of record in the file of this patent:

UNITED STATES PATENTS

| Number | Name | Date |
|---|---|---|
| 1,361,022 | Cucchiara | Dec. 7, 1920 |
| 1,363,175 | Benoit | Dec. 21, 1920 |
| 1,835,659 | Madison | Dec. 8, 1931 |
| 1,912,481 | Hubbard | June 6, 1933 |

FOREIGN PATENTS

| Number | Country | Date |
|---|---|---|
| 261,032 | Italy | Oct. 30, 1928 |